(12) United States Patent
Shinohara

(10) Patent No.: US 8,350,942 B2
(45) Date of Patent: Jan. 8, 2013

(54) SOLID-STATE IMAGING APPARATUS AND DRIVING METHOD THEREFOR

(75) Inventor: Mahito Shinohara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 12/815,538

(22) Filed: Jun. 15, 2010

(65) Prior Publication Data

US 2011/0013065 A1  Jan. 20, 2011

(30) Foreign Application Priority Data

Jul. 16, 2009  (JP) .................................. 2009-167950

(51) Int. Cl.
H04N 3/14 (2006.01)
H04N 5/335 (2006.01)
(52) U.S. Cl. ........................ 348/308; 348/294; 250/208.1
(58) Field of Classification Search .......... 348/294–310; 250/208.1
See application file for complete search history.

(56) References Cited

U.S. PATENT DOCUMENTS

| | | | |
|---|---|---|---|
| 4,962,412 A | 10/1990 | Shinohara et al. | 357/30 |
| 5,008,206 A | 4/1991 | Shinohara et al. | 437/3 |
| 5,086,326 A | 2/1992 | Shinohara et al. | 357/30 |
| 5,146,339 A | 9/1992 | Shinohara et al. | 358/212 |
| 5,280,358 A | 1/1994 | Yushiya et al. | 358/213.17 |
| 6,674,471 B1 | 1/2004 | Masuyama | 348/312 |
| 6,828,601 B2 | 12/2004 | Shinohara | 257/183.1 |
| 7,250,970 B2 | 7/2007 | Shinohara | 348/308 |
| 7,283,168 B2 * | 10/2007 | Watanabe | 348/308 |
| 7,394,492 B2 | 7/2008 | Shinohara | 348/301 |
| 7,741,593 B2 | 6/2010 | Iwata et al. | 250/214 R |
| 2005/0253945 A1 | 11/2005 | Shinohara | 348/300 |
| 2008/0252764 A1 | 10/2008 | Shinohara | 348/308 |
| 2009/0231478 A1 | 9/2009 | Shinohara | 348/300 |
| 2010/0002117 A1 | 1/2010 | Iwane et al. | 348/308 |
| 2010/0194946 A1 | 8/2010 | Shinohara et al. | 348/300 |
| 2011/0013045 A1* | 1/2011 | Tay | 348/222.1 |
| 2012/0086826 A1* | 4/2012 | Masuyama et al. | 348/220.1 |

FOREIGN PATENT DOCUMENTS

| | | |
|---|---|---|
| JP | 11-355664 A | 12/1999 |
| JP | 2008-099158 A | 4/2008 |

* cited by examiner

*Primary Examiner* — Anthony J Daniels
(74) *Attorney, Agent, or Firm* — Fitzpatrick, Cella, Harper & Scinto

(57) ABSTRACT

A solid-state imaging apparatus includes a photoelectric conversion unit for generating and accumulating an electric charge according to an incident light, a floating diffusion for accumulating electric charges, a transfer transistor for transferring electric charges accumulated in the photoelectric conversion unit to the floating diffusion unit, and a reset transistor for resetting a voltage according to electric charges accumulated in the floating diffusion unit. In addition, a drive circuit intermittently applies to a gate of the transfer transistor a pulse having a first potential which is intermediate between a transfer potential for transferring electric charges and a non-transfer potential for disabling transfer of electric charges and applies to a gate of the reset transistor a second potential lower than the potential of the pulse for resetting voltage of the floating diffusion unit and higher than the first potential, during accumulation of electric charges in the photoelectric conversion unit.

4 Claims, 3 Drawing Sheets

SOLID-STATE IMAGING APPARATUS AND DRIVING METHOD THEREFOR

BACKGROUND OF THE INVENTION

1. Field of the Invention

The present invention relates to a solid-state imaging apparatus and a driving method therefor.

2. Description of the Related Art

Solid-state imaging apparatuses include charge-coupled solid-state imaging apparatuses and amplifying solid-state imaging apparatus, respectively represented by CCD and CMOS sensors. An amplifying solid-state imaging apparatus typically has a photoelectric conversion unit, an amplifying transistor, a transfer transistor, and a reset transistor, in a pixel. Signal charges are transferred by the transfer transistor to a floating diffusion (hereinafter, FD) connected to a control electrode of the amplifying transistor, and amplified by the amplifying transistor to be output. Before signal transfer, the FD is reset by the reset transistor.

In general, when a large amount of incident light impinges on the photoelectric conversion unit of a pixel of a solid-state imaging apparatus, signal charges can overflow the photoelectric conversion unit. It is known that when overflowing electric charges leak into the photoelectric conversion units of neighboring pixels, a false signal called blooming is produced and manifests itself as a white smear on a screen. Under a dark condition with no incident light, a dark current produced in a photoelectric conversion unit manifests itself as a white blemish on a screen, and when such a dark current is produced in a large amount to cause corresponding blooming, the area of the white blemish will be larger.

For an amplifying solid-state imaging apparatus, a countermeasure against such blooming which leads to degradation in image quality is an operation of discharging a certain amount of electric charges into an FD through a transfer transistor while signal charges are being accumulated in a photoelectric conversion unit. Examples of this operation in a CMOS sensor are described in a Japan application publication, Japanese Patent Application Laid-Open No. H11-355664 (hereinafter, Patent Document 1), and a Japan application publication, Japanese Patent Application Laid-Open No. 2008-099158 (hereinafter, Patent Document 2). With a technique of Patent Document 1, control signals supplied to gates of a transfer transistor and a reset transistor during accumulation are biased. Accordingly, the transfer transistor and the reset transistors do not become completely off, releasing excess electric charges to a power source. According to Patent Document 2, during a signal charge accumulation period, a pulse having a lower potential than the potential at the time of signal charge transfer is intermittently applied to the gate of a transfer transistor, and during application of the intermittent pulse, electric charges overflowing the photoelectric conversion unit are discharged to the FD through the transfer transistor.

However, while the technique of Patent Document 2 inhibits blooming, the technique has a disadvantage of lowering sensor characteristics as described below. In the technique of Patent Document 2, inhibition of blooming would be substantially perfect if the above-described operation of discharging excess charge is performed regularly, not intermittently, during the signal charge accumulation period. To do so, however, it is necessary to keep the gate of the reset transistor in high-level state and the gate of the transfer transistor at a medium potential Vm for discharge of excess charge. In such a condition, the photoelectric conversion unit side of an element isolation region over which the gate of the reset transistor is positioned gets close to a weakly inverted state, stimulating production of a dark current. Also, the area below the gate of the transfer transistor becomes a weakly inverted state to increase dark current from a gate interface of the transfer transistor. Such dark current flows into the photoelectric conversion unit to degrade sensor characteristics. Thus, to minimize the time period for which such a condition lasts, the operation is performed intermittently. However, when the operation is performed as regularly as possible for prevention of blooming, dark current will increase for the above-described reason.

From another perspective, because the reset and transfer pulses of the intermittent operation are applied to all pixels of the sensor, when the operation is performed regularly, it leads to increase in consumed current and increase in dark current associated with heat generated from the consumed current. From yet another perspective, an upper-limit quantity of saturated charge that can be intrinsically accumulated in a photodiode reduces with a partial charge discharge operation as described above.

From still another perspective, a study by the present inventors also revealed such a disadvantage as follows. Because both the transfer and reset pulses are at low levels during a period in which the pulse of medium potential Vm for application to the gate of the transfer transistor is not applied, the FD is put in a floating state between 0 V and a reset potential. When focusing on a pixel that is in a dark state or a near dark state, the FD of the pixel can also be close to 0 V in the floating state. This is because FD is high in dark current because of its general structure and such dark current can be sometimes accumulated in the FD, and also because when the amount of incident light impinging on pixels neighboring the dark pixel of interest is large, electric charges overflowing the photoelectric conversion units of the neighboring pixels may flow into the FD of the pixel of interest. When the pulse of medium potential Vm is applied with the FD thus being 0 V or near 0 V, the electric charges in the FD are reversely transferred to the photoelectric conversion unit. As described above, the conventional blooming preventing operation has the disadvantage of having a mechanism that increases white blemishes due to dark current from the FD or possibly broadens blooming instead of eliminating it.

An object of the present invention is to provide a solid-state imaging apparatus that is capable of inhibiting blooming and a driving method therefor.

SUMMARY OF THE INVENTION

A solid-state imaging apparatus according to the invention comprises: a photoelectric conversion unit for generation and accumulating an electric charge according to an incident light; a floating diffusion; a transfer transistor transferring the electric charges accumulated in the photoelectric conversion unit to the floating diffusion; an amplifying transistor for amplifying a signal based on the electric charges in the floating diffusion; a reset transistor for resetting a voltage of the floating diffusion; and a drive circuit for intermittently applying to a gate of the transfer transistor a pulse of a first potential and also applying to a gate of the reset transistor a second potential, wherein said first potential is between ON state potential of the transfer transistor and OFF state potential of the transfer transistor, and said second potential is lower than a potential of ON state potential of the reset transistor and higher than the first potential.

Other features and advantages of the present invention will be apparent from the following description taken in conjunction with the accompanying drawings, in which like reference characters designate the same or similar parts throughout the figures thereof.

Further features of the present invention will become apparent from the following description of exemplary embodiments with reference to the attached drawings.

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

First Embodiment

Figure 1:
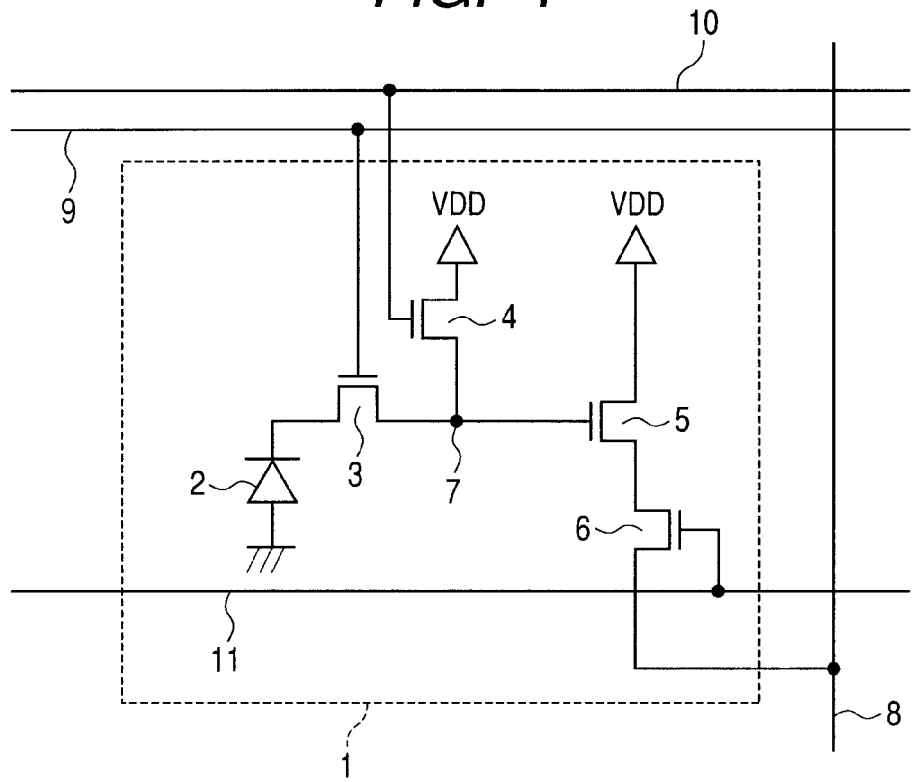
FIG. 1 is an equivalent circuit diagram of a pixel portion according to a first embodiment of the present invention.

FIG. 1 shows an exemplary configuration of a pixel portion of a solid-state imaging apparatus according to a first embodiment of the invention. The pixel portion includes: a unit pixel 1; a photodiode (PD) 2 functioning as a photoelectric conversion unit for generating an electric charge according to incident light and accumulating the charge; a transfer transistor 3 for transferring electric charges accumulated in the PD 2 to a floating diffusion (FD) 7; a reset transistor 4 for resetting voltage as a function of electric charges accumulated in the FD 7; an amplifying transistor 5 for amplifying voltage as a function of electric charges accumulated in the FD 7; a selecting transistor 6; an FD unit 7; a vertical signal line 8 for outputting an amplified pixel signal; a transfer control line 9 for applying a transfer pulse TRG to the gate of the transfer transistor 3; a reset control line 10 for applying a reset pulse RST to the gate of the reset transistor 4; and a transfer control line 11 for applying an output selection pulse SEL to the gate of the selecting transistor 6.

Figure 2:
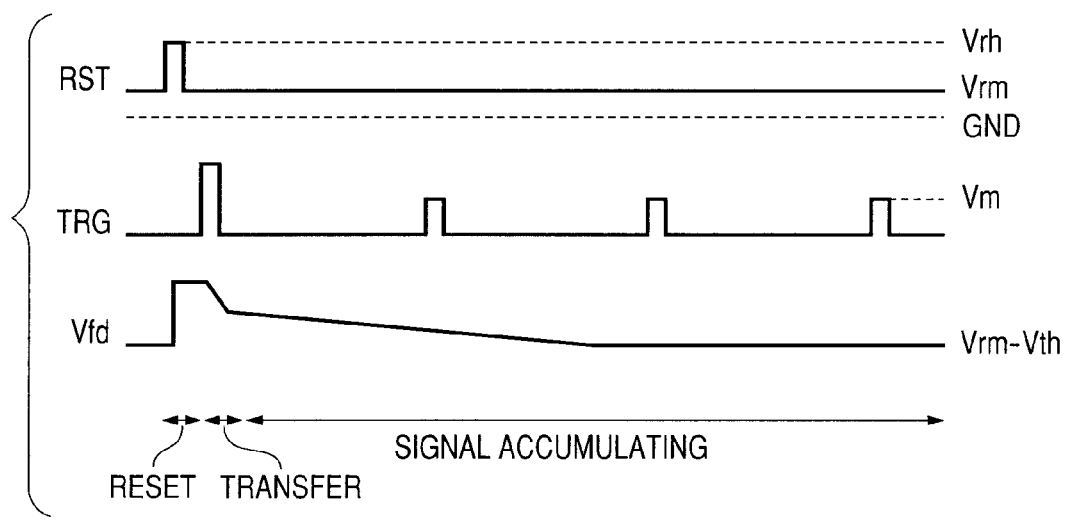
FIG. 2 is a driving pulse timing chart according to the first embodiment of the invention.

FIG. 2 is a pulse timing chart illustrating a driving method for the solid-state imaging apparatus according to the first embodiment of the invention. The reset pulse RST is a pulse applied to the gate of the reset transistor 4. The transfer pulse TRG is a pulse applied to the gate of the transfer transistor 3. Vfd represents variation in electric potential of the FD 7. Low-level potential Vrm of the reset pulse RST is a potential that is lower than the high-level potential Vrh of the reset pulse RST, higher than the potential of a well of the pixel that represents a ground potential GND, and higher than the medium potential Vm. Also, Vrm is desirably a value that does not increase dark current from a pixel isolation region. The potential Vm of the transfer pulse TRG is the medium potential for the gate of the transfer transistor 3 for discharging excess charge.

In a reset period, the reset pulse RST becomes high-level potential Vrh and then low-level potential Vrm. This causes the reset transistor 4 to turn on and the potential Vfd of the FD7 to become power-source potential VDD. Next, in a transfer period, the transfer pulse TRG becomes high-level and then low-level. This causes the transfer transistor 3 to turn on and the electric charges generated and accumulated in the PD 2 to be transferred to the FD 7. Next, in a signal accumulation period, the transfer pulse TRG intermittently becomes a pulse with the medium potential Vm and electric charges are generated and accumulated in the PD 2. The vertical drive circuit 16 (FIG. 4) intermittently applies a pulse having a first potential Vm, which is intermediate between a transfer potential for transferring electric charges and a non-transfer potential for disabling transfer of electric charges, to the gate of the transfer transistor 3 during electric charge accumulation in the PD 2. The transfer potential is at high-level and the non-transfer potential is at low-level. The vertical drive circuit 16 (FIG. 4) also applies a second potential Vrm, which is lower than the potential Vrh of the pulse for resetting the voltage of the FD 7 and higher than the first potential Vm, to the gate of the reset transistor 4 during electric charge accumulation in the PD 2.

In a signal accumulation period, the transfer transistor 3 first intermittently discharges only electric charges accumulated in the PD 2 that are equal to or above a predetermined level close to saturation to the FD 7, preventing electric charges from overflowing the PD 2 into neighboring pixels. In a signal accumulation period, the reset pulse RST maintains the fixed potential Vrm, so power consumption can be reduced compared with the conventional operation and hence corresponding increase in dark current resulting from heat generation can be prevented as well. When a threshold voltage for the transfer transistor 3 and the reset transistor 4 is denoted as Vth, the potential of the FD 7 is kept at a potential equal to or above (Vrm−Vth). This is because when electric charges flow into the FD 7 to urge the potential of the FD 7 to lower, the reset transistor 4 becomes on and electric charges flowing into the FD 7 are discharged to a drain of the reset transistor 4. On the other hand, when the gate potential of the transfer transistor 3 becomes potential Vm due to the intermittent pulse of the transfer pulse TRG, a channel potential of the transfer transistor 3 never exceeds (Vm−Vth). This prevents reverse transfer of electric charges in the FD 7 that have a potential equal to or above (Vrm−Vth) to the PD 2 through the transfer transistor 3. It is therefore possible to reliably eliminate a blooming phenomenon without incurring increase in white blemishes associated with dark current from the FD 7 or expansion of blooming through the FD 7 as found in the conventional operation.

Second Embodiment

Figure 3:
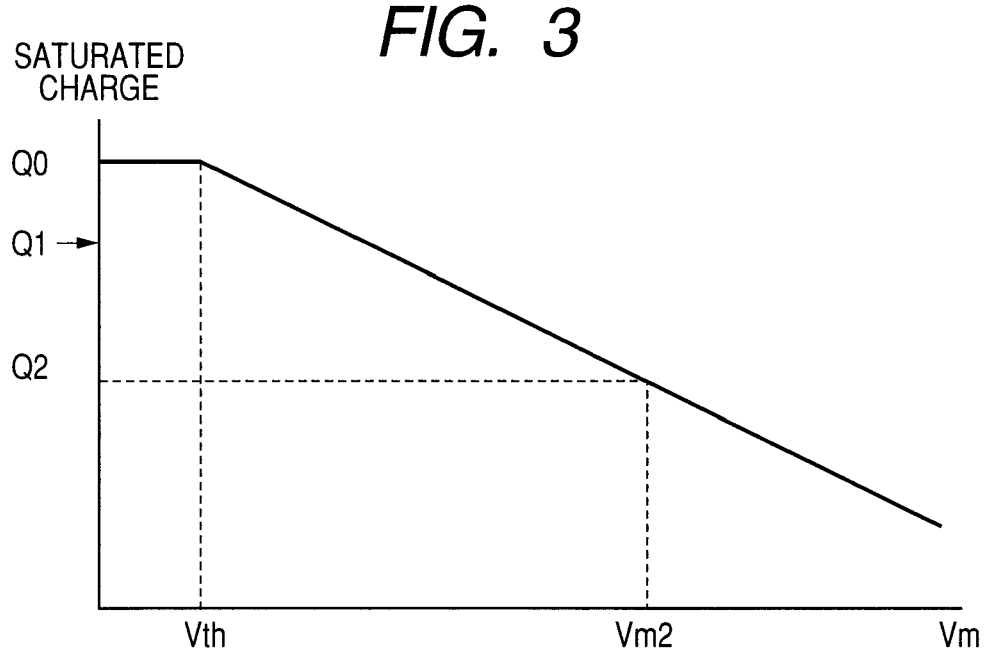
FIG. 3 is a plot illustrating saturated charge in a second embodiment of the invention.

A solid-state imaging apparatus according to a second embodiment of the invention is described. FIG. 3 is a plot illustrating saturated charge Q of the PD 2 at the time when part of charges in the PD 2 is discharged by applying the intermittent transfer pulse TRG having the potential Vm, where the horizontal axis represents potential Vm and the vertical axis represents saturated charge Q. In the plot, Q0 represents Vm=0, that is, the saturated charge of the PD 2 with the intermittent transfer pulse not applied. Q1 represents a minimum saturated charge required for a picture-signal input side when gain G applied to picture signal voltage is 1. Vm2 indicates a value of Vm that makes the saturated charge of the PD 2 be Q2=Q0/2. Vm2 is determined by the structure of the PD 2 and the transfer transistor 3. Strictly, saturated charge also depends on a time interval between the last intermittent transfer pulse and a signal readout, but for the sake of brevity, saturated charge immediately after application of the intermittent transfer pulse is discussed herein. Q is in a linear relation with Vm when Vm>Vth, and it is understood that Equation (1) holds from a simple calculation.

$$Q=Q0\{1+(Vth-Vm)/2(Vm2-Vth)\} \quad (1)$$

On the other hand, picture signal input voltage is a value within a predetermined range, and the minimum saturated charge required when gain is G is Q1/G. Therefore, set Vm that satisfies Equation (2):

$$Q1/G<=Q0\{1+(Vth-Vm)/2(Vm2-Vth)\} \quad (2)$$

That is to say, when Vm is set so that Vm<=Vth+2(Vm2−Vth) {1−Q1/(G·Q0)}, the blooming prevention operation can be performed without losing saturated charge required as a picture signal. Again, Vm<Vrm is required to hold. Vm in Equation (2) depends on gain G, meaning that the higher the gain G, a higher Vm, namely a higher blooming prevention effect, can be set. The present embodiment is an amplifying solid-state imaging apparatus that controls the value of Vm according to the set value of gain G so as to satisfy Equation 2 about dependence on gain G derived above.

Figure 4:
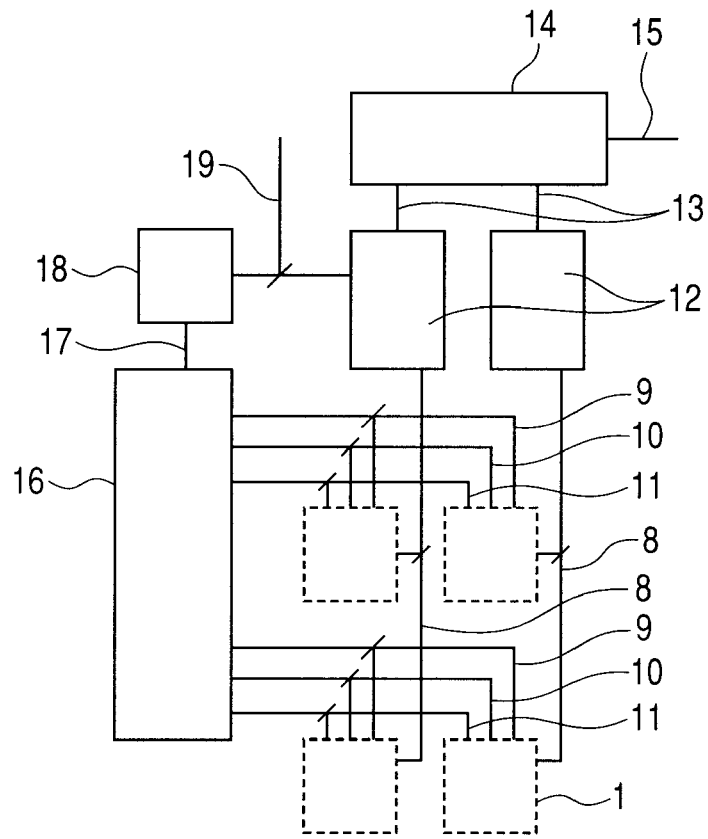
FIG. 4 is a block diagram of a solid-state imaging apparatus according to the second embodiment of the invention.

FIG. 4 is a block diagram of the solid-state imaging apparatus according to the second embodiment of the invention, where the same components as those in FIG. 1 are denoted with the same reference numerals and are not described again. In the figure, a pixel region is represented as a 2×2 array of pixels 1 for the sake of simplicity. A columnar amplifier 12 is connected with the vertical signal line 8 of each column of pixels 1 for amplifying signals from the pixels 1 in the column. A columnar amplifier output line 13 is for outputting signals amplified by each columnar amplifier 12. A horizontal scan circuit 14 sequentially selects the columnar amplifier output lines 13 of respective columns. A horizontal output line 15 is an output line on which signals from the pixels 1 amplified according to scanning by the horizontal scan circuit 14 are output. A vertical drive circuit 16 is connected with the transfer control line 9, reset control line 10, and selection control line 11 of each row of pixels 1, and supplies the transfer pulse TRG, reset pulse RST, and output selection pulse SEL to the control lines for each row. A line 17 supplies the potential Vm of a transfer pulse for excess charge discharge which is generated in the vertical drive circuit 16. A Vm-setting circuit 18 makes the potential Vm variable and supplies selected potential Vm to the line 17. A gain control line 19 is connected to the columnar amplifier 12 and the Vm-setting circuit 18, for setting the gain G of the columnar amplifier 12 and the potential Vm set by the Vm-setting circuit 18 at the same time in relation to each other. The Vm-setting circuit 18 may be configured to set a potential Vm that is highest within the range of potential Vm satisfying Equation (2), with respect to gain G.

With such a solid-state imaging apparatus, blooming prevention effect can be maximized without impairing substantial saturation especially when gain is high. Although in FIG. 4 the gain of the columnar amplifier 12 is related to the potential Vm, gain of any amplifier that amplifies pixel output signals can be related to the potential Vm in addition to the columnar amplifier 12. The amplifier may be any amplifier connected downstream of the amplifying transistor 5 and amplifying output signals from the amplifying transistor 5.

Figure 5:
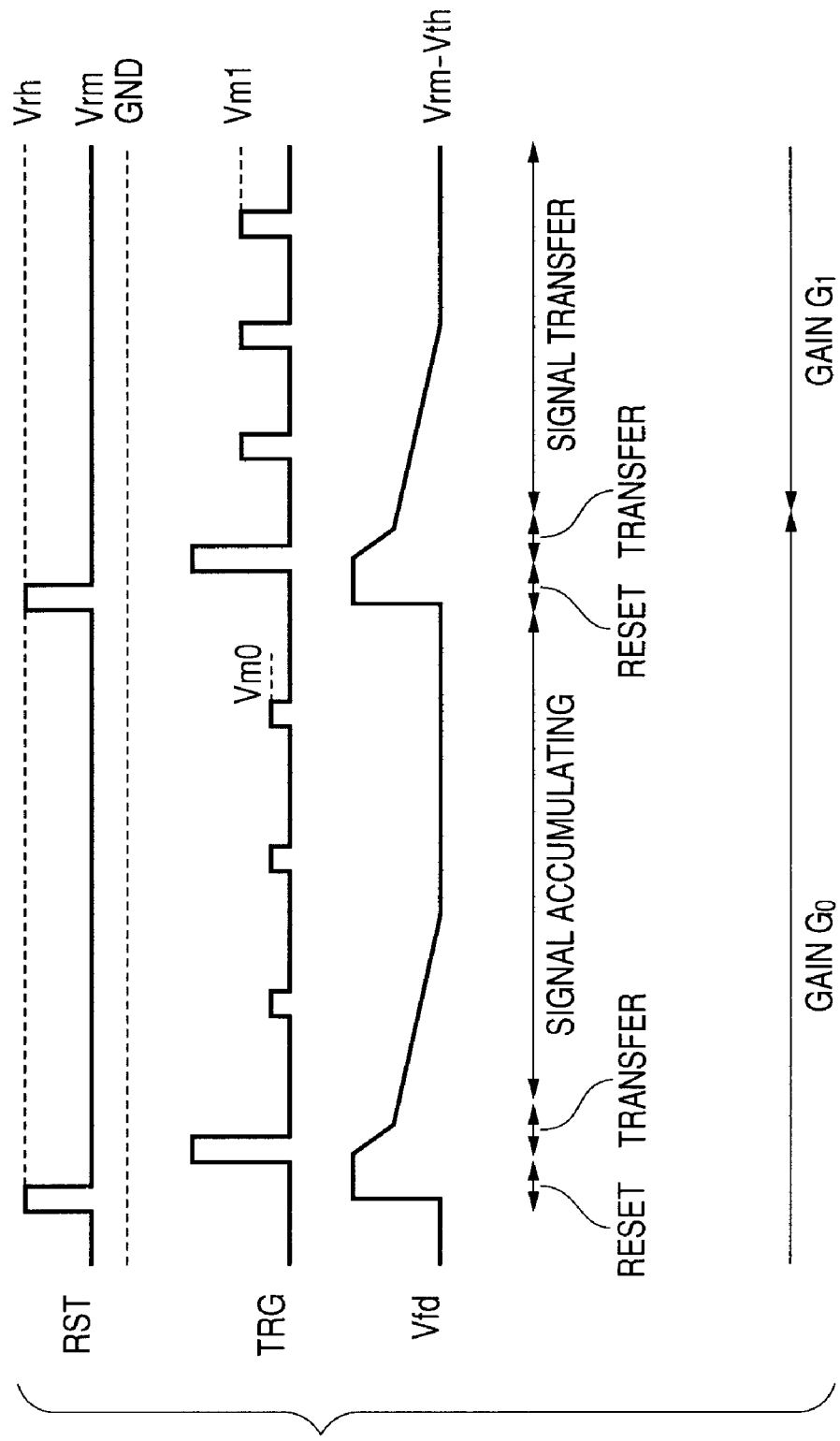
FIG. 5 is a driving pulse timing chart according to the second embodiment of the invention.

FIG. 5 is a pulse timing chart illustrating a driving method for the solid-state imaging apparatus according to the second embodiment of the invention, where elements common to those of FIG. 2 are denoted with the same reference numerals or symbols and their detailed descriptions are omitted. FIG. 5 shows a situation where the intermittent pulse potential applied to the gate of the transfer transistor 3 during signal charge accumulation changes from Vm0 to Vm1 when the set gain of an amplifier to amplify a pixel output signal changes from G0 to G1. When G0<G1, Vm0=<Vm1. Following signal accumulation, reset of the FD 7 and transfer of signal charge take place. Further, before and after signal charge transfer, a reset potential of the FD 7 and a potential immediately after signal charge transfer may be output by the amplifying transistor 5 of the pixel. Switching of the set gain G takes place after signal readouts before and after signal transfer that follows signal accumulation finish and the signal is amplified with the set gain G. The vertical drive circuit 16 variably controls the first potential Vm applied to the gate of the transfer transistor 3 according to gain G of the amplifier during charge accumulation in the PD 2.

Setting of the set gain G and corresponding potential Vm has been described. One factor that influences blooming prevention effect is the frequency of an excess charge discharge pulse applied to the gate of the transfer transistor 3: the higher the frequency, the higher the excess charge discharge effect will be. Therefore, such a configuration is also possible that relates the gain for amplifying a pixel signal to the pulse frequency and controls the pulse frequency according to the value of gain. In this case, the component denoted as 17 in FIG. 4 will be a control line for determining the frequency of an excess charge discharge pulse applied to the gate of the transfer transistor 3 and the component denoted as 18 will be a frequency selection circuit therefor. Also in this case, the frequency selection circuit 18 selects a higher frequency for a higher gain value that has been set, so that blooming prevention effect can be maximized especially when gain is high without impairing substantial saturation. The vertical drive circuit 16 variably controls the frequency of an excess charge discharge pulse applied to the gate of the transfer transistor 3 according to gain G of the amplifier during electric charge accumulation in the PD 2.

Although the descriptions above on the first and second embodiments assume that signal charges accumulated in the PD 2 are electrons and transistors that constitute the pixel 1 are N-type MOS transistors, the present invention is not limited thereto. The signal charges may also be holes and the transistors in the pixel 1 may be P-type MOS transistors, in which case polarity of the drive pulse and magnitude of pulse potential will be reverse. Also, when each pixel 1 is designed to have one photodiode 2 and one transfer transistor 3, a number of pixels 1 may share the amplifying transistor 5, or the selecting transistor 6 may be omitted.

During a signal charge accumulation period, the potential value Vrm is set to such a constant value that keeps the gate of the reset transistor 4 intermediate between high and low levels and that makes the portion below the element isolation region beneath the gate of the reset transistor 4 maintain an enhanced state sufficiently. And during a signal charge accumulation period, an intermittent pulse operation having the medium potential Vm is implemented only at the gate of the transfer transistor 3. This operation inhibits generation of dark current from beneath the element isolation region and consumed current due to application of the reset pulse RST. Further, when a high gain is applied to the picture signal of the solid-state imaging apparatus, by performing the intermittent pulse operation at the gate of the transfer transistor 3 described above or controlling the value of Vm according to the value of gain applied to the picture signal, blooming can be prevented while deterring reduction in saturation.

With reduction of power consumption for driving according to the first and second embodiments, dark current is decreased and a blooming phenomenon of an amplifying solid-state imaging apparatus is reliably deterred without causing increase in white blemishes due to dark current from the FD 7 and expansion of blooming through the FD 7. In addition, when gain applied to picture signals is high, a higher effect of deterring a blooming phenomenon can be obtained.

The above-described embodiments both merely show specific examples of carrying out the present invention, and the technical scope of the invention should not be construed as limitative with those embodiments. That is to say, the invention can be practiced in any of various forms without departing from the technical idea or key features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-167950, filed Jul. 16, 2009, which is hereby incorporated by reference herein in its entirety.

What is claimed is:

1. A solid-state imaging apparatus comprising:
   a photoelectric conversion unit for generating and accumulating an electric charge according to an incident light;
   a floating diffusion;
   a transfer transistor transferring the electric charges accumulated in the photoelectric conversion unit to the floating diffusion;
   an amplifying transistor for amplifying a signal based on the electric charges in the floating diffusion;
   a reset transistor for resetting a voltage of the floating diffusion; and
   a drive circuit for intermittently applying to a gate of the transfer transistor a pulse of a first potential and also applying to a gate of the reset transistor a second potential
   wherein said first potential is between ON state potential of the transfer transistor and OFF state potential of the transfer transistor, and said second potential is lower than a potential of ON state potential of the reset transistor and higher than the first potential.

2. The solid-state imaging apparatus according to claim 1, further comprising
   an amplifier connected at a stage following the amplifying transistor to amplify an output signal from the amplifying transistor, wherein,
   during the accumulation of the electric charge by the photoelectric conversion unit, according to a gain of the amplifier, the drive circuit controls variably the first potential applied to the gate of the transfer transistor.

3. The solid-state imaging apparatus according to claim 1, further comprising
   an amplifier connected at a stage following the amplifying transistor to amplify an output signal from the amplifying transistor, wherein,
   during the accumulation of the electric charge by the photoelectric conversion unit, according to a gain of the amplifier, the drive circuit controls variably a frequency of the pulse applied to the gate of the transfer transistor.

4. A driving method of a solid-state imaging apparatus comprising:
   a photoelectric conversion unit for generating and accumulating an electric charge according to an incident light;
   a floating diffusion;
   a transfer transistor the electric charge accumulated in the photoelectric conversion unit to the floating diffusion;
   an amplifying transistor for amplifying a signal based on the electric charge in the floating diffusion; and
   a reset transistor for resetting a voltage of the floating diffusion, the method comprising:
   a driving step for applying to a gate of the transfer transistor intermittently a pulse of a first potential between a transferring potential for transferring the electric charge and a non-transferring potential for non-transferring the electric charge, and
   a driving step for applying to a gate of the reset transistor a second potential lower than a potential for resetting the floating diffusion and higher than the first potential, and
   wherein the driving step for applying the pulse to the gate of the transfer transistor, and the driving step for applying the second potential to the gate of the reset transistor are performed during the accumulation of the electric charge by the photoelectric conversion unit.

\* \* \* \* \*